United States Patent [19]

Bennett et al.

[11] Patent Number: 4,972,800
[45] Date of Patent: Nov. 27, 1990

[54] PET LITTER BOX

[76] Inventors: Earl W. Bennett; S. Karen Bennett, both of 409 SE. 21st Ave., Cape Coral, Fla. 33990

[21] Appl. No.: 460,517

[22] Filed: Jan. 3, 1990

[51] Int. Cl.$^5$ ............................................. A01K 29/00
[52] U.S. Cl. ......................................... 119/166; 119/19
[58] Field of Search .................... 119/1, 19, 17, 20, 27; 209/309

[56] References Cited

U.S. PATENT DOCUMENTS

| | | | |
|---|---|---|---|
| 920,975 | 5/1909 | Minion | 119/19 |
| 1,773,141 | 8/1930 | Hodgson . | |
| 1,815,467 | 7/1931 | Graig | 119/19 |
| 1,878,459 | 9/1932 | Bliss et al. | 119/19 |
| 2,671,427 | 3/1954 | Fell . | |
| 3,048,147 | 8/1962 | McKean | 119/19 |
| 3,233,588 | 2/1966 | Thomas . | |
| 3,476,083 | 11/1969 | Vander Wall . | |
| 4,242,763 | 1/1981 | Walker | 119/1 |
| 4,393,812 | 7/1983 | Ahrens | 119/16 |
| 4,696,257 | 9/1987 | Neary et al. | 119/19 |
| 4,756,273 | 7/1988 | Yananton . | |

*Primary Examiner*—John Weiss
*Attorney, Agent, or Firm*—Fleit, Jacobson, Cohn, Price, Holman & Stern

[57] ABSTRACT

A litter box especially adapted for use by pet dogs and similar small animals which includes a tray having a shallow upstanding peripheral wall adapted to receive a newspaper or other material capable of absorbing moisture combined with an upstanding wall structure pivotally connected to one end edge of the tray with the upstanding wall structure including a screen bottom and an entrance area in one portion of a peripheral wall. One end of the wall structure is provided with supporting legs and the other end provided with a handle to enable the wall structure to be pivoted upwardly from a horizontal in-use position to a generally vertical position to provide access to the tray to replace the newspaper or other material.

6 Claims, 1 Drawing Sheet

U.S. Patent
Nov. 27, 1990
4,972,800
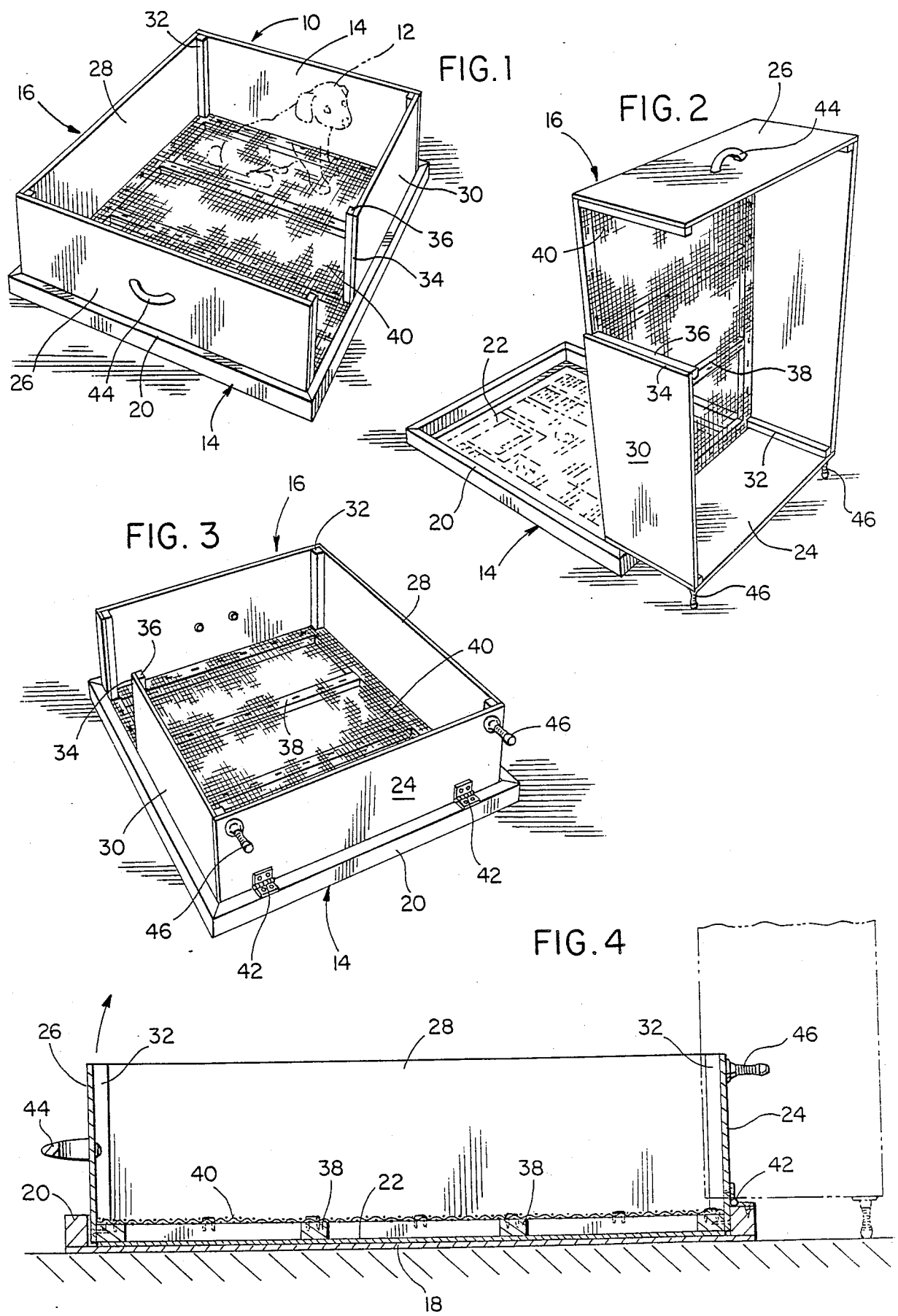

PET LITTER BOX

BACKGROUND OF THE INVENTION

1. Field of the Invention

The present invention generally relates to a litter box for pets and more specifically a litter box especially adapted for use by pet dogs and similar small animals which includes a tray having a shallow upstanding peripheral wall adapted to receive a newspaper or other material capable of absorbing moisture combined with an upstanding wall structure pivotally connected to one end edge of the tray with the upstanding wall structure including a screen bottom and an entrance area in one portion of a peripheral wall. One end of the wall structure is provided with supporting legs and the other end provided with a handle to enable the wall structure to be pivoted upwardly from a horizontal in-use position to a generally vertical position to provide access to the tray to replace the newspaper or other material.

2. Information Disclosure Statement

Litter boxes of various types have been provided especially for use by cats, kittens and the like and such devices usually include a litter material that is absorptive and which enables a cat or kitten to deposit excrement as necessary in a sanitary manner. The following U.S. patents relate to this field of endeavor.

1,773,141
2,671,427
3,233,588
3,476,083
4,756,273

While the prior patents disclose the general idea of providing a litter box, they do not disclose the particular structural arrangement of the present invention including the tray, the upstanding wall structure with the screen bottom that is hingedly attached to the tray with the wall structure having an entrance opening therein and hinge structure and supporting structure to retain the wall structure in a vertical position when the newspaper in the tray is being removed and replaced.

SUMMARY OF THE INVENTION

An object of the present invention is to provide a pet litter box and more specifically a litter box especially adapted for small dogs that must relieve themselves while in the house with the litter box including a shallow tray having a replaceable newspaper positioned therein combined with an upstanding wall structure pivotally attached to one end of the shallow tray and capable of being positioned vertically to provide access to the newspaper when it is being replaced.

Another object of the invention is to provide a pet litter box in accordance with the preceding object in which the wall structure includes a screen bottom and a lateral opening to provide access into the interior of the wall structure when the wall structure is in horizontal position overlying the tray.

A further object of the invention is to provide a pet litter box in accordance with the preceding objects in which the wall structure is pivotally connected to the tray at one end and the other end of the wall structure includes a handle to pivot the wall structure from a horizontal to a vertical position and the hinged end of the wall structure includes supporting stops spaced from the pivotal axis to engage a floor surface or the like in spaced relation to the tray and the hinge axis to support the wall structure in a vertical stable position.

Yet another important object of the present invention is to provide a pet litter box for dogs which is simple in construction, sanitary in use, easy to maintain in sanitary condition and capable of being constructed in a permanent model and a portable model to facilitate use by persons owning dogs when at home or when travelling.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the pet litter box of the present invention illustrating the association of the components when the litter box is in condition for use.

FIG. 2 is a perspective view of the litter box with the wall structure supported in vertical position to expose the upper end of a shallow tray to enable removal and replacement of a newspaper in the shallow tray.

FIG. 3 is a perspective view of the litter box taken from the end thereof opposite to FIG. 1.

FIG. 4 is a vertical, sectional view, on an enlarged scale, illustrating the specific structure of the tray and pivotal wall structure including a screen bottom, and other structure of the litter box.

DESCRIPTION OF THE PREFERRED EMBODIMENT

Referring now specifically to the drawings, the pet litter box of the present invention is generally designated by reference numeral 10 and is especially adapted for use by small pet dogs 12 although it can be used by other pets or animals. The litter box 10 includes a shallow tray generally designated by reference numeral 14 and an upstanding wall structure generally designated by numeral 16 which is normally positioned in overlying superimposed relation to the tray when in use as illustrated in FIGS. 1, 3 and 4.

The tray 14 includes an imperforate bottom panel 18 of rectangular configuration provided with a shallow, upstanding peripheral wall 20 that provides a retainer for sheets of newspaper 22 or the like which may be a folded, multiple sheet arrangement of newspaper or other paper material or absorptive material. The shallow tray 14 is generally rectangular in configuration and may be constructed of various materials including wood, plastic, metal or any combinations thereof. The bottom panel 18 and peripheral wall 20 are constructed of liquid impervious material so that any liquid excrement discharged onto the newspaper 22 will be retained within the tray and absorbed by the newspaper.

The wall structure 16 includes a pair of opposed, vertically extending end walls 24 and 26 and a pair of opposed, parallel, vertical side walls 28 and 30 with the walls 24 and 26 being perpendicular to the walls 28 and 30. As illustrated in FIG. 4, the bottom edges of the walls 24-30 telescope interiorly of the peripheral wall 20 on the shallow tray 14 when the wall structure 10 is in its horizontal in-use position.

The corners of the wall structure each have an interior corner member 32 reinforcing the vertical walls and connecting the walls to each other. This provides a rigid, generally rectangular wall structure which is open at the top. The wall 30 is provided with an entrance opening 34 extending throughout the vertical height of the wall 30 with the opening 34 being located adjacent the end wall 26 although this location could vary. One side edge of the opening 34 is provided with a reinforcing member 36 similar to the corner members 32 and one of the corner members 32 which joins with the side wall 30 forms the opposite edge of the access opening 34.

Extending transversely between the bottom edges of the walls 28 and 30 is a plurality of vertically narrow support rails or frame members 38 which are rigidly affixed to the walls by suitable fasteners, adhesive bonding or the like. Secured to the upper surface of the transverse rails or frames 38 is a screen member 40 forming a bottom for the wall structure with the screen member 40 engaging the upper surface of the transverse rails 38 and thus being spaced above the newspaper 18 with the transverse rails 38 engaging the upper surface of the newspaper 18 to retain it in flat condition throughout the surface area of the bottom panel 18 as illustrated in FIG. 4.

In order to replace the newspaper 22, the wall structure 16 can be pivoted from a horizontal position in overlying supporting engagement on the tray 14 to a generally vertical position as illustrated in FIG. 2. The end wall 24 is provided with hinges 42 adjacent the lower edge thereof which are connected to the outer surface of the end wall 24 and the upper surface of the peripheral wall 20 of the tray 10 as illustrated in FIGS. 3 and 4. The hinges 42 enable the wall structure to be pivoted about a generally transverse axis along one end edge of the tray 10. The opposite end wall 26 is provided with an external handle 44 of generally U-shaped configuration similar to handles used on various furniture items and the like thereby enabling a person desiring to pivot the wall structure between horizontal and vertical positions to merely grasp the handle 44 and swing the wall structure about the hinges 42. In order to support the wall structure 16 in a stable manner when oriented vertically, the end wall 24 is provided with a pair of outwardly extending stops or legs 46 which are relatively short and located adjacent the upper corners of the wall 24 as illustrated in FIG. 3. When the wall structure 16 is pivoted to a vertical position, the stops 46 engage the floor surface in spaced relation to the hinges 42 in a manner to support the wall structure 16 in a stable, vertical position as illustrated in FIGS. 2 and 4.

In using the litter box, it is only necessary to place a discarded newspaper in the top of the tray and pivot the wall structure 16 downwardly to overlie and engage the newspaper. The litter box is then ready for use by a dog or other animal and is quite convenient and easy to maintain and store in a convenient place. The screen bottom 40 permits passage of liquid excrement therethrough so it can be absorbed by the newspaper while leaving solid material on the screen so that it can be easily removed. The surfaces of the device can be easily cleaned in order to maintain the device in sanitary condition. The device is effective in training a dog with only minimal instructions and patience being required since dogs will quickly understand that they should deposit their excrement in their own private litter box. This eliminates the necessity of having to take a pet or dog outdoors for relief and eliminates the risks and dangers that accompany this procedure by avoiding contact with mosquitos, insects, fleas and the like and also avoiding unwanted contact with other animals, predators and the like. The device may be constructed in a permanent form in which the walls are rigidly connected to each other and are constructed of relatively lightweight but rigid materials which can be easily cleaned In a portable form of the invention, the vertical walls are removably connected to each other so that they can be removed and folded into a flat condition for storage or transport. This arrangement is very effective for people who travel and take their dog with them since it can be assembled very quickly in a hotel or motel room and the components may be constructed of fabric material which can be washable and available in choice of colors or patterns For example, each wall may be constructed of a frame with a fabric covering that can be available in a choice of colors or patterns to provide a highly attractive litter box for a pet dog or other small animal. This device is especially useful for those who live in apartments, condominiums, mobile homes and the like and in any situation where it is not desirable to take a pet out of doors for discharging excrement.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A litter box for pets such as small dogs and the like comprising a shallow tray adapted to rest upon a supporting surface and receive a newspaper in the upper surface thereof, an upstanding wall structure mounted on said tray, said wall structure including upright walls, hinge means connecting one of said walls to the tray for pivotal movement from a position overlying the tray to a generally vertical, upright position, said wall structure including a screen bottom adapted to be positioned adjacent the newspaper to enable absorption of liquid excrement discharged onto the screen bottom, and access means incorporated into one of said walls to enable a pet to enter and leave the interior of the wall structure.

2. The structure as defined in claim 1 together with handle means on said wall structure to facilitate pivotal movement between horizontal operative position and generally vertical, upright open position.

3. The structure as defined in claim 2 together with projecting stop members on the wall structure in spaced relation to the hinge means to stably support the wall structure when in vertical, open position.

4. The structure as defined in claim 3 wherein said access means is an enlarged opening extending from the top edge to the bottom edge of said wall structure adjacent one end of a wall forming the wall structure.

5. The structure as defined in claim 4 together with transverse rails between the lower end portions of opposed portions of the wall structure with the screen being supported by the rails in spaced relation to the newspaper on the tray.

6. The structure as defined in claim 5 wherein said tray includes an imperforate bottom panel and an upstanding peripheral wall telescopically receiving the lower edge of the wall structure.

* * * * *